March 10, 1970 R. L. T. TUDOR-OWEN 3,500,205

COMMUNICATION SYSTEMS EMPLOYING CODE MODULATION

Filed Aug. 3, 1966 2 Sheets-Sheet 1

INVENTOR

RONALD LLEWLYN TREVOR TUDOR-OWEN

BY

Kinnear, Kinnear & Ottinger

ATTORNEYS

INVENTOR

RONALD LLEWLYN TREVOR TUDOR-OWEN

BY [signature]

ATTORNEYS

United States Patent Office 3,500,205

Patented Mar. 10, 1970

3,500,205

COMMUNICATION SYSTEMS EMPLOYING CODE MODULATION

Ronald Llewelyn Trevor Tudor-Owen, Emsworth, England, assignor to General Electric Company Limited, London, England, a British company Filed Aug. 3, 1966, Ser. No. 570,000
Int. Cl. H04b 7/00, 1/62
U.S. Cl. 325—38 4 Claims

ABSTRACT OF THE DISCLOSURE

A transmitter for use in a Delta-Sigma modulation communication system wherein the dynamic range of the modulating signal which can be transmitted is increased by varying the amplitude of the pulses fed back to the differencing arrangement with and in the same sense as the level of the modulating signal as represented by the encoded signal. A receiver for use in a system using the transmitter is also disclosed.

This invention relates to communication systems employing code modulation.

The invention relates particularly to communication systems employing code modulation of the kind wherein the encoded signal comprises a train of pulses, the density of said pulses in said train varying in accordance with the instantaneous value of a modulating signal.

In one proposed system of the kind specified the encoded signal effectively comprises selected ones of a regular series of pulses of uniform amplitude and having a repetition rate considerably higher than the highest frequency in the modulating signal, the selection of pulses being made according to whether the integral of a signal representative of the algebraic difference between the value of the modulating signal and the value of the encoded signal has a value above or below a reference value. In such a system the spacing between the pulses of the regular series may be finite or zero. One such system has been described in an article entitled "A Telemetering System by Code Modulation—Delta-Sigma Modulation" which appears on pages 204 to 209 of the September 1962 issue of the I.R.E. Transactions on Space Electronics and Telemetry.

One disadvantage of this proposed system is that at otherwise suitable pulse repetition rates the dynamic range of the modulating signal which can satisfactorily be transmitted is small, and it is an object of the present invention to provide a system of the kind specified wherein this disadvantage is alleviated.

According to the present invention in a communication system employing code modulation of the kind specified, the encoded signal is derived by selection of pulses from a regular series of pulses of uniform amplitude and having a repetition rate considerably higher than the highest frequency in the modulating signal, the selection of pulses being made according to whether the integral of a signal representative of the algebraic difference between the value of the modulating signal and the value of a signal corresponding to the encoded signal, but in which the amplitude of the pulses varies with, and in the same sense as, the level of those components of the encoded signal which correspond to the modulating signal, has a value above or below a reference value.

The present invention also provides a receiver for use in a communication system in accordance with the invention comprising means for deriving from the received signal a signal corresponding to the transmitted encoded signal, means for varying the amplitude of the pulses in the derived signal in accordance with, and in the same sense as, the level of the modulating signal represented by the transmitted encoded signal, and means for deriving from the modified derived signal the modulating signal represented by said modified signal.

One communication system in accordance with the invention and suitable for the transmission of audio frequency signals will now be described, by way of example, with reference to the accompanying drawing in which.

Figure 1:
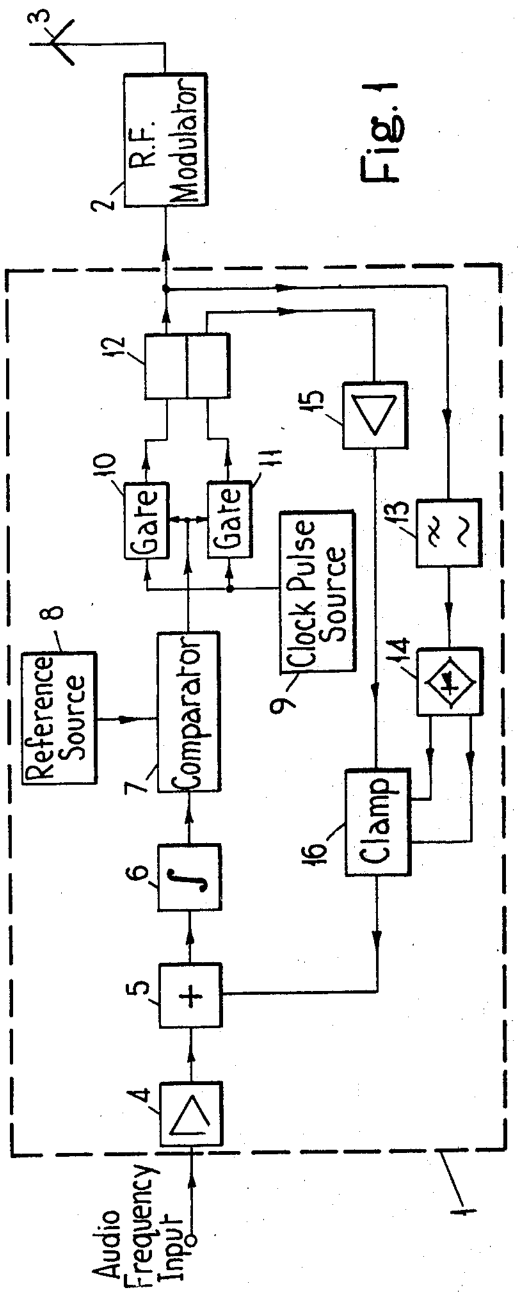
FIGURE 1 is a block schematic diagram of a transmitter in the system.

Referring now to FIGURE 1, the transmitter incorporates a code modulator 1 wherein the audio frequency signal to be transmitted is encoded into pulse form. The encoded signal is fed to a modulator 2 where it is utilised to amplitude modulate a radio frequency carrier wave in conventional manner, and the modulated carrier wave is fed to an aerial 3.

In the code modulator 1 the audio frequency signal to be be transmitted is fed via an amplifying circuit 4 to an adding circuit 5 where it is added to a signal derived from the output of the modulator 1, the precise form of this signal being explained below. The resulting signal is fed via an integrator 6 to a comparator 7 whose output indicates whether the value of the integrated signal at its input is above or below a reference value supplied by a source 8.

The modulator 1 further includes a source of clock pulses 9 having a repetition frequency considerably greater than the highest frequency present in the audio frequency signal to be transmitted. The output of the pulse source 9 is supplied to the inputs of two gate circuits 10 and 11 which form a pulse selection circuit and are controlled by the output of the comparator 7 so that only one gate circuit 10 is open when the value of the integrated signal is above the reference value, and only the other gate circuit 11 is open when the value of the integrated signal is below the reference value. The outputs of the gate circuits 10 and 11 are utilized to control a pulse generator comprising a bistable trigger circuit 12 so that, when one gate 10 is open, each pulse produced by the pulse source 9 will operate the trigger circuit 12 into one of its conditions, or maintain it in that condition, and, when the other gate circuit 11 is open, each pulse produced by the pulse source 9 will operate the trigger circuit 12 into its other condition, or maintain it in that other condition.

From the trigger circuit 12 there is derived a first output signal which effectively comprises a series of pulses, each having a duration equal to the period of the clock pulses, there being one pulse for each clock pulse passed by the gate circuit 10. This signal thus effectively comprises selected ones of a regular series of pulses of uniform amplitude having a repetition rate equal to that of the clock pulses, and a duration equal to the period of the clock pulses so that the spacing between the pulses of the regular series is zero, selection of pulses being made according to whether the value of the integrated signal is above or below the reference value.

This pulse signal, which constitutes the encoded signal, is fed to the radio frequency modulator 2, and, in addition, is fed to a low pass filter 13. For reasons explained in greater detail below, the waveform of the signal appearing at the output of the filter 13 approximately corresponds to the waveform of the audio frequency signal to be transmitted. This output signal is fed to a full wave rectifying arrangement 14 arranged to produce two voltages of opposite polarity and equal magnitude with respect to a reference value, which magnitude is proportional to the level of the output signal of the filter 13. The time constants of the rectifying arrangement 14 are chosen so that the output of the rectifying arrangement will accurately follow variations in the level of the output of the filter 13 up to a frequency of about 20 cycles per second, and the reference value is equal to the mean value of the audio frequency signal at the output of the amplifying circuit 4.

A second output is also derived from the trigger circuit 12 which is the inverse of the first-mentioned output, this second output being fed via an amplifying circuit 15 to a clamping circuit 16. In the clamping circuit, the peaks of the positive-going excursions and the peaks of the negative-going excursions of the amplified second output signal of the trigger circuit 12 are respectively clamped at the value of the output of the rectifying arrangement 14 which is positive with respect to the reference level and the output of the rectifying arrangement which is negative with respect to the reference level. The output of the clamping circuit 16 thus comprises a pulse signal which is effectively the inverse of the encoded signal fed to the radio frequency modulator 2 but in which the amplitude of the pulses varies with the level of the audio frequency signal represented by the encoded signal.

The output of the clamping circuit 16 is fed to the adding circuit 5 so that the output of the adding circuit 5 is a signal representative of the algebraic difference between the value of the audio frequency signal to be transmitted and the value of a pulse signal corresponding to the encoded signal fed to the radio frequency modulator 2, but in which the amplitude of the pulses varies with the level of the audio frequency signal represented by the encoded signal.

It may be shown that the number of pulses appearing in unit time in the encoded signal varies with the instantaneous value of the audio signal applied to the input of the code modulator 1, the number of pulses appearing in unit time being substantially equal to half the clock pulse frequency when the instantaneous value of the audio signal is zero and correspondingly larger or smaller when the instantaneous value is above or below zero; thus an encoded signal may be decoded by passing it through a suitable low pass filter. With a given clock pulse frequency, the maximum audio signal level which the code modulator 1 can satisfactorily handle corresponds to the minimum audio signal level for which, at the positive peaks, every clock pulse produces a corresponding pulse in the first output of the trigger circuit 12, and, at the negative peaks, no clock pulse produces a corresponding pulse in the first output of the trigger circuit 12. If the clamping arrangement were omitted and the second output of the trigger circuit were fed back directly to the adding circuit 5, then, assuming the code modulator 1 has a linear input/output characteristic, the change in the number of pulses occurring in unit time in the code modulator output for unit change in the instaneous value of the audio input signal would have a certain substantially constant value. With the clamping arrangement included, due to the variation of the amplitude of the pulses in the signal fed back to the adder 5 from the output of the code modulator 1 with the level of the audio signal represented by the encoded signal, the change in the number of pulses occurring in unit time in the code modulator output resulting from the unit change in the instantaneous value of the audio input signal varies with and in the opposite sense to the level of the audio signal represented by the encoded signal. The range of audio input signal levels which the code modulator can handle is thus increased.

It will be appreciated that the audio signal represented by the output of the code modulator 1 has a smaller dynamic range than the audio signal applied to the code modulator. The effect produced by the clamping circuit 16 is thus similar to that produced by feeding the audio signal to be transmitted to the input of the code modulator 1 via a compressor. The arrangement described, however, is relatively simple compared with a compressor, particularly in view of the fact that the compressor would be required to operate at low input signal levels.

Figure 2:
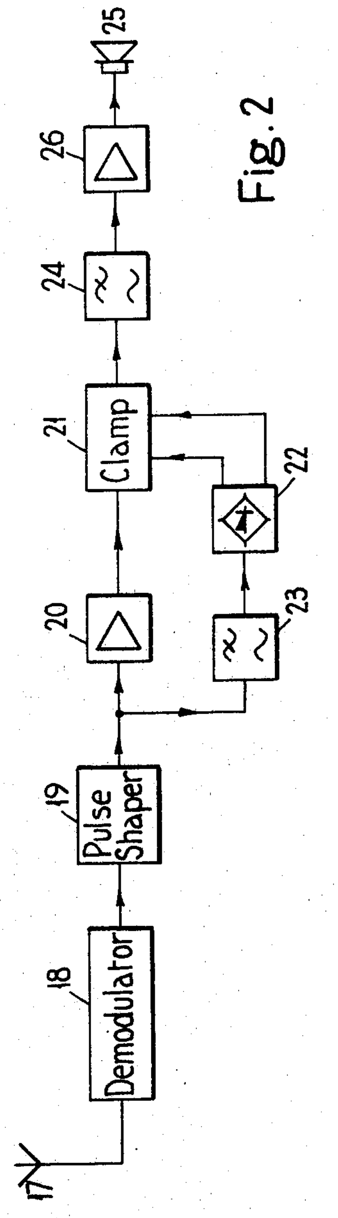
FIGURE 2 is a block schematic diagram of a receiver in the system.

Referring now to FIGURE 2, at a receiver of the system, the transmitted signal is picked up by an aerial 17 and its envelope detected in conventional manner in a demodulator 18. The resultant signal is then fed to a pulse shaping circuit 19 to provide a pulse signal corresponding to the encoded signal produced in the transmitter. The reshaped signal is then fed via an amplifier 20 to a clamping circuit 21, which operates in a similar manner to the clamping circuit 16 in the transmitter, and serves to vary the amplitude of the pulses in the signal applied to it, with and in the same sense as the level of the audio signal represented by the signal at the output of the pulse shaping circuit 19. To this end, clamping is controlled by voltages produced by a full wave rectifying arrangement 22 from the output of a low pass filter 23 to which the output of the pulse shaping circuit 19 is fed.

The output of the clamping circuit 21 is fed to a further low pass filter 24 and the audio signal appearing at the output of the further filter is amplified, and fed to a loudspeaker 25 via an audio amplifier 26.

It will be appreciated that the degree of variation of the amplitude of the pulses of the received encoded signal effected by the clamping arrangement is arranged to be such as to compensate for the volume compression effected by the clamping arrangement in the transmitter. The dynamic range of the audio signal fed to the loudspeaker 25 is thus the same as the dynamic range of the audio input signal fed to the code modulator 1 in the transmitter.

Figure 3:
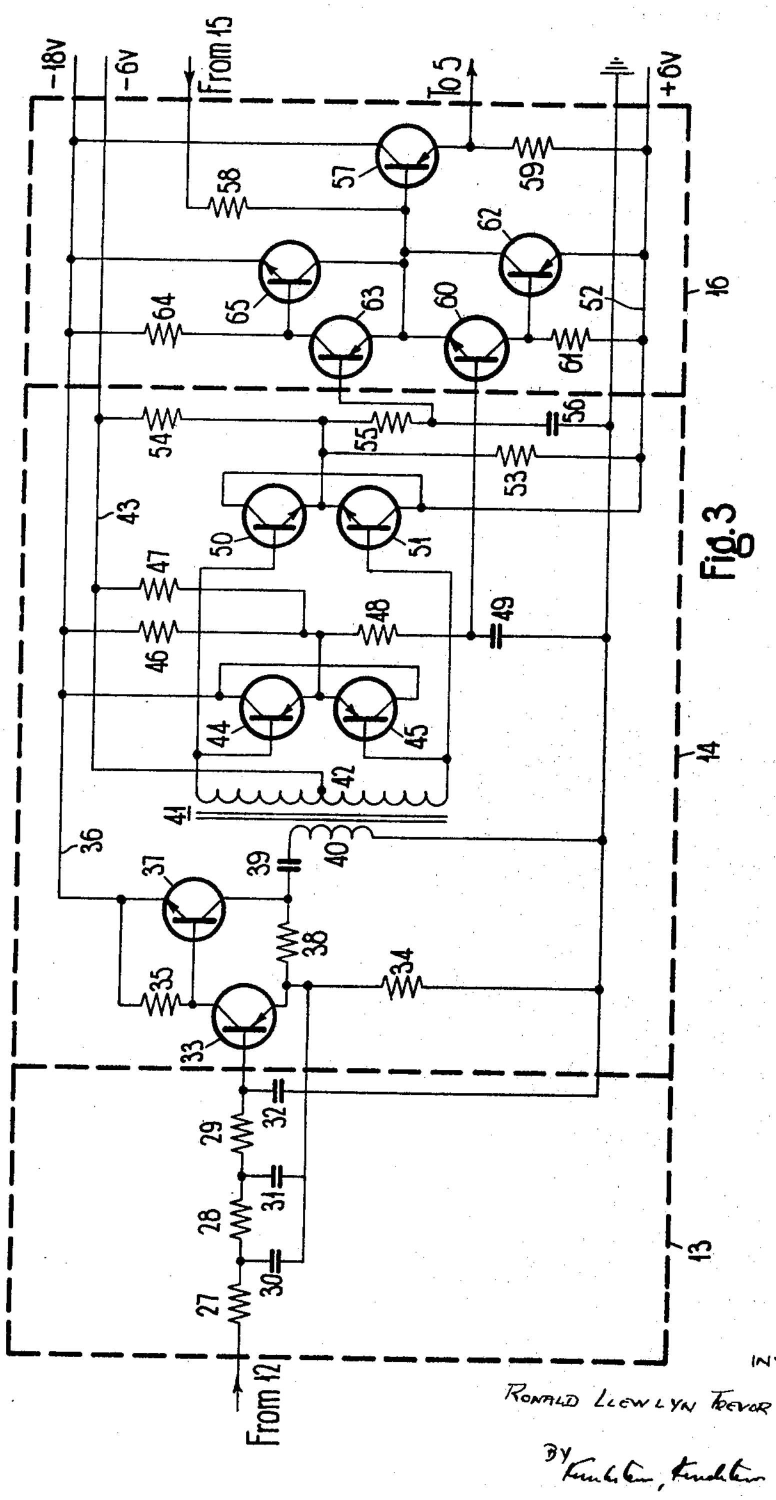
FIGURE 3 is a circuit diagram of parts of the transmitter shown in FIGURE 1.

The low pass filter 13, the rectifying arrangement 14 and the clamping circuit 16 in the transmitter will now be described in detail with reference to FIGURE 3.

The low pass filter 13 comprises three series-connected resistors 27, 28 and 29 and three shunt capacitors 30, 31 and 32. The encoded signal developed at the first output of the trigger circuit 12 is applied to one end of the resistor chain 27, 28 and 29 and the other end of the resistor chain is connected to the base of a PNP transistor 33 incorporated in the rectifying arrangement 14. The capacitors 30 and 31 are respectively connected between the junction between the resistors 27 and 28 and the emitter of the transistor 33 and between the junction between the resistors 28 and 29 and the emitter of the transistor 33, and the capacitor 32 is connected between the end of the resistor 29 connected to the base of the transistor 33 and earth.

The emitter of the transistor 33 is connected to earth via a resistor 34 and the collector of the transistor 33 is connected via a resistor 35 to a line 36 which is maintained at a potential of 18 volts negative with respect to earth. The collector of the transistor is also connected to the base of an NPN transistor 37 which forms a high current gain arrangement with the transistor 33, the emitter of the transistor 37 being connected to the line 36 and the collector of the transistor 37 being connected via a resistor 38 to the emitter of the transistor 33.

The collector of the transistor is also connected via a capacitor 39 to one end of the primary winding 40 of a 4:1 step-up transformer 41, the other end of the winding being earthed.

The centre point of the secondary winding 42 of the transformer 41 is connected to a line 43, which is maintained at a potential of 6 volts negative with respect to earth, and the ends of the winding 42 are respectively connected to the bases of two PNP transistors 44 and 45 connected in a full wave rectifying arrangement. The collectors of the transistors 44 and 45 are connected to the line 36 and the emitters of the transistors 44 and 45 are further connected to the junction between two resistors 46 and 47 which are connected in series between the lines 36 and 43, and the junction between the resistors 46 and 47 is further connected via a resistor 48 to one terminal of a capacitor 49 whose other terminal is earthed.

The ends of the secondary winding 42 are also connected to the bases of two NPN transistors 50 and 51 which are connected in a similar arrangement to the transistors 44 and 45, the collectors of the transistors 50 and 51 being connected to a line 52 maintained at a potential of 6 volts positive with respect to earth, the emitters of the transistors 50 and 51 being connected to the junction between two resistors 53 and 54 connected in series between the lines 52 and 43, and the junction of the resistors 53 and 54 being connected via a resistor 55 to one terminal of a capacitor 56 whose other terminal is earthed.

The voltages developed across the two capacitors 49 and 56 constitute the two output voltages of the rectifying arrangement.

The clamping circuit 16 incorporates a PNP transistor 57 to the base of which the output of the amplifier 15 is applied via a resistor 58, the collector of the transistor being connected to the line 36 and the emitter of the transistor 57 being connected via a resistor 59 to the line 52.

The potential at the terminal of the capacitor 49 remote from earth is applied to the base of an NPN transistor 60 whose emitter is connected to the base of the transistor 57, and whose collector is connected via a resistor 61 to the line 52. The transistor 60 is associated with a PNP transistor 62 to form a high current gain arrangement, the base of the transistor 62 being connected to the collector of the transistor 60 and the emitter and collector of the transistor 62 being respectively connected to the line 52 and the emitter of the transistor 60.

The potential at the terminal of the capacitor 56 remote from earth is applied to the base of a PNP transistor 63 whose emitter is connected to the base of the transistor 57, and whose collector is connected via a resistor 64 to the line 36. The transistor 63 is associated with an NPN transistor 65 to form a high current gain arrangement, the base of the transistor 65 being connected to the collector of the transistor 63 and the emitter and collector of the transistor 65 being respectively connected to the line 36 and the emitter of the transistor 63.

The output of the clamping circuit 16 is derived from across the resistor 59.

In operation, the audio frequency signal represented by the encoded signal at the output of the code modulator 1 is applied to the primary winding 40 of the transformer 41 from the output of the low-pass filter 13 via the amplifier incorporating the transistors 33 and 37.

The potential at the unearthed terminal of the capacitor 49 approximately follows the potential at the junction between the resistors 46 and 47. When the level of the audio signal is zero, the transistors 44 and 45 are non-conducting and the potential at the unearthed terminal of the capacitor 49 is slightly more negative than the line 43, the values of the resistors 46 and 47 being in the ratio 12:1. As the level of the audio signal rises from zero, the transistors 44 and 45 conduct during alternate half cycles to a degree depending on the peak value of the audio signal; thus, the potential at the unearthed terminal of the capacitor 49 tends to vary with the peak-to-peak value of the audio signal between a value slightly more negative than the line 43 and a value approximately equal to the potential at the collectors of the transistors 44 and 45, that is the potential of the line 36. The potential at the unearthed terminal of the capacitor 49 thus varies with the level of the audio signal between a value slightly more negative than 6 volts negative with respect to earth, and a value 18 volts negative with respect to earth.

Similarly the potential at the unearthed terminal of the capacitor 56 varies with the level of the audio signal between a value slightly more positive than 6 volts negative with respect to earth when the audio signal is zero and the transistors 50 and 51 are non-conducting, and a value of 6 volts positive with respect to earth when the audio signal level is a maximum and the transistors 50 and 51 are fully conducting.

The signal applied to the transistor 58 from the amplifier 15 varies in potential from 18 volts negative with respect to earth to 6 volts positive with respect to earth. When the potential at the end of the resistor 58 connected to the base of the transistor 57 goes more negative than the potential at the unearthed terminal of the capacitor 49, the transistors 60 and 62 start to conduct thus preventing the potential at the base of the transistor 57 going appreciably more negative than the potential at this terminal of the capacitor 49. Similarly, the transistors 63 and 65 serve to prevent the potential at the base of the transistor 57 from going appreciably more positive than the potential at the unearthed terminal of the capacitor 56.

Thus, the peak-to-peak amplitude of the voltage appearing across the resistor 59 is limited to the difference between the potentials at the unearthed terminals of the capacitors 49 and 56, and thus varies with, and in the same sense as, the level of the audio signal represented by the encoded signal.

The circuits of the low pass filter 23, the rectifying circuit 22 and the clamping circuit 21 in the receiver are substantially the same as the corresponding circuits described above with reference to FIGURE 3.

It will be understood that in the system described above, by way of example, the dynamic range of the modulating signal expressed in decibels which the system can satisfactorily transmit is doubled compared with a system not including a clamping arrangement because the feedback loop has a linear characteristic. In other arrangements in accordance with the invention, by using a feedback loop having a suitable non-linear characteristic, the dynamic range of the modulating signal which the system can transmit can be increased by a greater or smaller amount.

I claim:

1. In a transmitter for use in a code modulation communication system, the transmitter comprising (1) an input path via which a modulating signal is applied to the transmitter;

(2) a source of clock pulses having a repetition rate considerably greater than the highest frequency in the modulating signal required to be transmitted;

(3) pulse selection means to which an output from said source of clock pulse is applied;

(4) pulse generating means for producing in response to the output of said pulse selection means a train of pulses of regular amplitude and duration, in which train there is one pulse for each pulse in the output of said pulse selection means;

(5) means for transmitting said series of pulses of regular amplitude and duration;

(6) comparator means, having first and second inputs for controlling said pulse selection means so that clock pulses from said source are selected by said pulse selection means only when the value of a signal applied to the first input of said comparator means differs in a predetermined sense from the value of a reference signal applied to the second input of said comparator means;

(7) integrating means whose output is applied to said first input of said comparator means; and (8) means for applying to the input of said integrating means a signal representative of the algebraic difference between the values of the modulating signal and a pulse sigual derived from the output of said pulse generating means:

that improvement for increasing the dynamic range of the modulating signal which can be transmitted comprising, (9) means for varying the amplitude of the pulses in said signal derived from the output of said pulse generating means with, and in the same sense as, the level of those components in the output of said pulse generating means which correspond to the modulating signal.

2. A transmitter according to claim 1 wherein said means for varying the amplitude of the pulses includes: low pass filter means for deriving from the output of said pulse generating means the modulating signal as represented by the output of said pulse generating means; means for producing a voltage whose value varies substantially with the level of said derived modulating signal; and means for producing in response to the output of said pulse generating means a train of pulses corresponding to the output of said pulse generating means but in which the amplitude of the pulses varies substantially in accordance with the value of said voltage.

3. A transmitter according to claim 1 wherein said means for varying the amplitude of the pulses includes: low pass filter means for deriving from the output of said pulse generating means the modulating signal as represented by the output of said pulse generating means; rectifying means for producing two voltages of opposite polarity with respect to a reference value which is dependent on the mean value of the modulating signal, the magnitudes of said two voltages being equal to one another and varying with the level of said derived modulating signal; and means for producing, in response to the output of said pulse generating means, a train of pulses corresponding to the output of said pulse generating means but in which the peaks of the positive-going excursions and the peaks of the negative-going excursions are respectively clamped at the values of said two voltages.

4. A receiver for use in a communication system employing code modulation of the kind wherein the encoded signal comprises a train of pulses, the density of the pulses in said train varying in accordance with the instantaneous value of a modulating signal and the modulating signal being subjected to volume compression during transmission, the receiver comprising:

first means for producing from the received signal a signal comprising a train of pulses of regular amplitude and duration, which train corresponds to the transmitted encoded signal;

second means comprising a low pass filter for producing from the output of said first means the modulating signal represented by said train of pulses;

third means comprising rectifying means for producing two voltages of opposite polarity with respect to a reference value which is dependent on the mean value of the modulating signal represented by the output of said first means, the magnitudes of said two voltages being equal to one another and varying with the level of the modulating signal represented by the output of said first means;

fourth means for producing in response to the output of said first means a train of pulses corresponding to the train of pulses at the output of said first means but in which the peaks of the positive-going excursions and the peaks of the negative-going excursions are respectively clamped at the values of said two voltages produced by said third means; and fifth means comprising a low pass filter for producing from the output of the fourth means the modulating signal represented by the train of pulses at the output of the fourth means.

References Cited

UNITED STATES PATENTS

| | | | |
|---|---|---|---|
| 2,662,113 | 12/1953 | Shouten et al. | |
| 2,897,275 | 7/1959 | Bowers. | |
| 3,249,870 | 5/1966 | Greefkes | 325—38 |
| 3,267,391 | 8/1966 | Balder et al. | 325—38 X |

JOHN W. CALDWELL, Primary Examiner

RICHARD K. ECKERT, Jr., Assistant Examiner

U.S. Cl. X.R.

325—38; 332—11